United States Patent [19]
Lamothe

[11] 3,854,371
[45] Dec. 17, 1974

[54] ANCHOR BOLT PROTECTIVE CAP

[76] Inventor: Surguies M. Lamothe, 1813 Feronia St., Metarie, La. 70005

[22] Filed: May 10, 1973

[21] Appl. No.: 359,020

[52] U.S. Cl............................ 85/1 R, 52/699, 85/35, 151/21 R, 138/96 T, 116/124 R
[51] Int. Cl. ... F16b 35/00, F16b 37/00, F16b 39/20
[58] Field of Search ............. 85/1 R, 35, 56, 53, 33, 85/32 V, 62; 151/21 R, 21 C, 19 R; 138/96 T, 96 R; 285/93, 252, 243; 52/699; 116/124 R, 114 R

[56] References Cited
UNITED STATES PATENTS

| | | | |
|---|---|---|---|
| 2,424,604 | 7/1947 | Dzus | 151/21 R |
| 2,661,768 | 12/1953 | Novak et al. | 285/93 X |
| 2,958,549 | 11/1960 | Spafford | 285/252 X |
| 3,288,497 | 11/1966 | Nydam | 285/177 X |
| 3,321,217 | 5/1967 | Ahlstone | 285/18 |
| 3,458,184 | 7/1969 | Schlosser | 52/699 X |
| 3,563,131 | 2/1971 | Ridley | 85/1 R |

FOREIGN PATENTS OR APPLICATIONS

| | | | |
|---|---|---|---|
| 44,726 | 10/1888 | Germany | 285/93 |
| 6,809,623 | 1/1970 | Netherlands | 52/699 |

*Primary Examiner*—Ramon S. Britts
*Attorney, Agent, or Firm*—John F. Sieberth

[57] ABSTRACT

Described is a radially yieldable protective cap to encase and tightly grip the threaded shank of an anchor bolt. The cap is quickly and easily applied to the anchor bolt—the cap loosely receives the threaded shank in its bore and the slack is taken up by applying a tie wire or clamp around the cap, the resulting constrictive force giving rise to the tight grip. The wall around the bore preferably has threads or projections to enhance the gripping. The body is preferably slitted or most preferably, slotted so that is radially contracts on application of the constrictive force. The top of the cap preferably has a threaded stud to carry the nut to be used on the anchor bolt. Devices for indicating the location of the upper end of the encased shank are also described. The caps enable the bolts to be suspended from a frame, or template during pouring and curing of the concrete in which the bolts are being imbedded and afford protection to the threads during this entire period.

28 Claims, 15 Drawing Figures

PATENTED DEC 17 1974 3,854,371

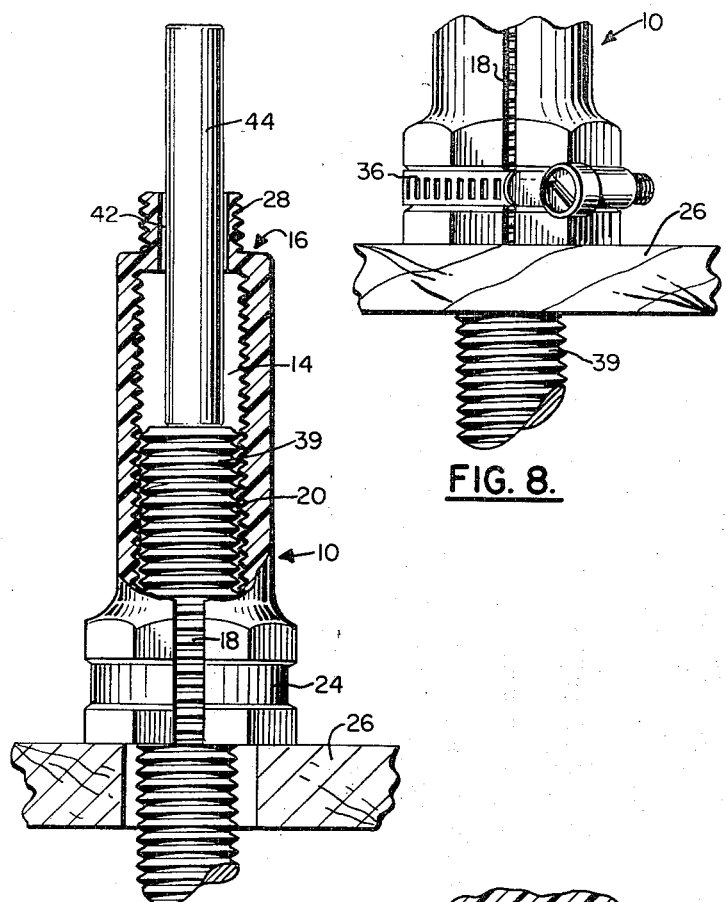
FIG. 7.
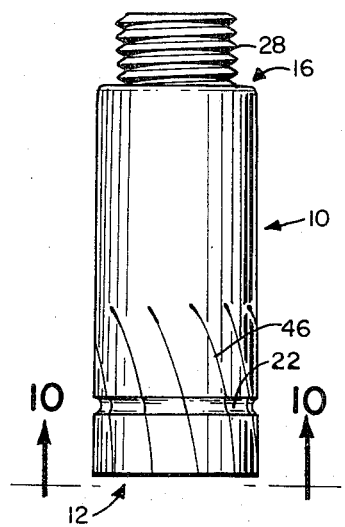
FIG. 8.
FIG. 9.
FIG. 10.
FIG. 11.
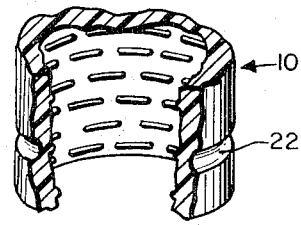
FIG. 14.
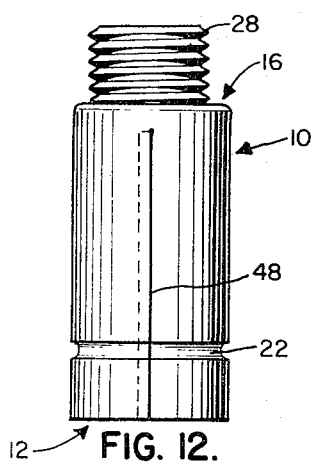
FIG. 12.
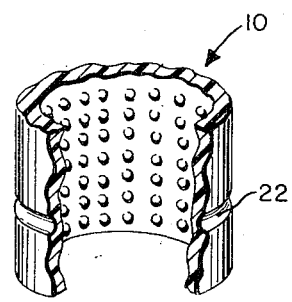
FIG. 15.
FIG. 13.

ANCHOR BOLT PROTECTIVE CAP

Anchor bolts are widely used for the purpose of fastening machinery, process equipment, storage vessels, lamp posts, railings, columns, and other such items to suitable foundations, such as poured concrete. Installation of anchor bolts is commonly practiced by suspending them in position from a frame or template supported at about the level of the foundation to be poured and holding them in this position during the pouring and curing of the concrete. In this operation the anchor bolts are affixed to the template with their threaded ends extending upwardly through properly positioned holes in the template, a nut and, if necessary, a washer effecting the attachment.

While workable, the foregoing method of attachment leaves much to be desired. In the first place since it is not uncommon to have two to three inches of threads exposed above the top of the nut, a fair amount of time and effort is necessarily expended in applying and, subsequently, in removing the nut. In addition, in the pouring and distribution of the concrete, wet concrete is frequently splashed on the exposed threads. Compounding this problem is the ever-present tendency for the exposed threads to become rusty, especially in open-air installations. When these things happen it is often necessary to clean the exposed threads with a wire brush in order to back off the nut. Further, the exposed threads are susceptible to damage if accidently struck by objects being moved on or over the cured foundation prior to removal of the nut and the template.

A welcome contribution to the art would be an effective means of obviating the foregoing difficulties. This invention is believed to represent such a contribution.

In accordance with this invention a protective cap is provided for use with anchor bolts or other similar threaded members. The cap is capable of being installed rapidly on and removed rapidly from the threaded shank of the anchor bolt protruding through the template. The cap encases the threaded shank and thus protects it against splashing concrete, excessive rust formation and physical damage due to accidental impacts or the like. And in addition, the cap is adapted to be tightly fitted on the threaded shank by means of a tie wire or simple clamp. Thus in this respect it serves the same function as the nut which is conventionally used for effecting the attachment to the template. However, by substituting a cap of this invention for the nut, not only is the attachment function of the nut realized, but in addition, the cap may be more rapidly installed and removed, and it affords several types of protection not available when using a nut. Other aspects, advantages, features and characteristics of this invention will become apparent from the ensuing description, accompanying drawings and appended claims.

In one embodiment of this invention a combination is provided which comprises an anchor bolt having a threaded shank, a template to position the anchor bolt in a selected locus, the template having an aperture therethrough to accommodate said threaded shank, radially yieldable capping means having a bore therein adapted to receive and encase an end portion of said threaded shank, and clamping means. In this combination the threaded shank of the anchor bolt extends upwardly through the aperture of the template and into the bore of the capping means supported on the template, and the clamping means applies a constrictive force around the bore of the capping means so that the anchor bolt is held in position.

Another embodiment of this invention is a cap adapted to protect and be tightly fitted over the end of a threaded shank which comprises a hollow tubular body having an open end, said body (a) being adapted to receive and loosely encase a length of the threaded shank, (b) having a slotted wall in which at least one slot extends from the open end toward the other end, (c) having thread gripping means circumferentially positioned on at least a portion of the interior surface of the slotted wall, and (d) being sufficiently radially deformable under application of a constrictive force to the exterior of the body to cause said thread gripping means to tightly engage at least a portion of the threaded shank encased by said body.

A further embodiment of this invention involves the provision of a radially deformable cap as described in the preceding paragraph but which is not necessarily slotted and which has at its upper end a threaded stud sized to receive a nut which fits the thread on the anchor bolt. This feature keeps the nut with the anchor bolt so that it is at hand when the time comes for removing the template and mounting the object being installed on the finished foundation. In this embodiment the cap may be rendered radially deformable by various means, such as by providing a plurality of slits in the body so that it telescopically contracts under application of the constrictive force, by utilizing a cap made of an elastic or flexible material so that the constrictive force causes sufficient gripping between the cap and the threads to occur, or by other suitable means.

A particularly preferred embodiment of this invention involves providing a cap as above-described having both a slotted wall and a threaded stud for the nut. Still other preferred embodiments include different types of movable means projecting from the cap for indicating the location of the upper end of the threaded shank encased by the cap. These and other embodiments will become still further apparent as the description proceeds.

In the accompanying drawings are depicted illustrative and in many cases preferred embodiments of this invention which, of course, may be modified in accordance with the spirit of the invention herein described and the scope of the invention herein claimed. In the drawings:

FIG. 7 is a front elevation, partly broken away and partly in vertical section depicting a particularly preferred embodiment, viz., a slotted cap of this invention having both a threaded stud for carrying a nut and an elongated member slidable in an axially extending aperture within said stud to indicate the location of the upper end of the encased threaded shank;

FIG. 8 depicts an alternative type of clamping means applying constrictive force around the bore of a cap of this invention to hold in position a threaded member encased by the cap;

FIG. 9 is a front elevation of a radially yieldable cap of this invention involving a slitted wall configuration;

FIG. 10 is a view of the cap of FIG. 9 taken from line 10—10 of FIG. 9;

FIG. 11 is the same view as FIG. 10 but schematically illustrating the manner by which gripping takes place when a constrictive force is applied around the base of the cap shown in FIG. 9;

FIG. 12 is a front elevation of a cap of this invention having a pair of slits on the opposite sides of the wall;

FIG. 13 is a bottom view of the cap of FIG. 12 schematically illustrating the manner by which gripping occurs when a constrictive force is applied around the base of the bore of the cap depicted in FIG. 12;

FIG. 14 is a fragmentary view in perspective of the base of a cap of this invention depicting an alternative type of thread gripping means on the interior wall; and FIG. 15 is a fragmentary view in perspective of the base of a cap of this invention depicting still another type of thread gripping means on the interior wall.

Throughout the drawings the same numerical legends are used to identify the same parts.

Figure 4:
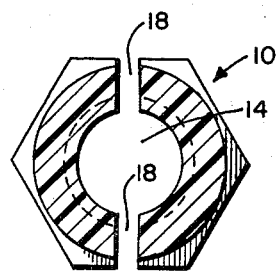
FIG. 4 is a section taken along line 3—3 of FIG. 1 but involving a cap having two slots in the wall thereof instead of one as depicted in FIG. 1.

In the embodiments shown in the Figures, the cap is composed of a hollow tubular body 10 having an open end 12. Bore 14 axially extends from open end 12 toward the other end 16 and is sized to receive and loosely encase a length of a threaded shank 39 of an anchor bolt 40 or the like (e.g., note FIG. 7). In the embodiments shown in FIGS. 1-4 and 6-8 the body wall contains slot 18 extending from open end 12 toward end 16. In the form depicted the slot extends linearly from end 12 toward end 16 although the slot may extend up the wall in a helical path, in a zig zag path, or it may proceed by a path of any other suitable axial configuration. In any case, the slot cuts through (i.e., radially traverses) the sidewall of the tubular body. As indicated by FIG. 4, body 10 may be provided with a plurality of slots if desired, although a single slot is preferable in most cases.

Figure 2:
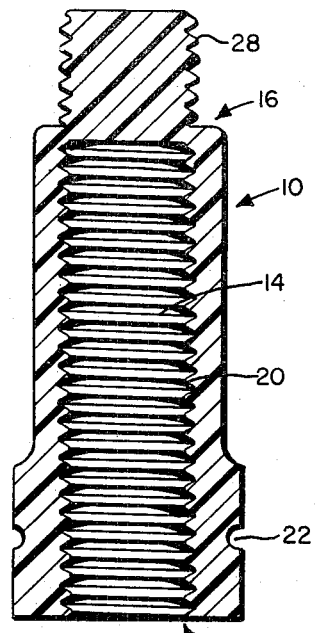
FIG. 2 is a section of the cap of FIG. 1 taken along line 2—2 of FIG. 1.
Figure 3:
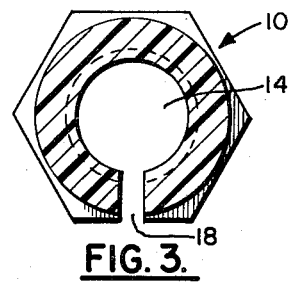
FIG. 3 is a section of the cap of FIG. 1 taken along line 3—3 of FIG. 1.
Figure 5:
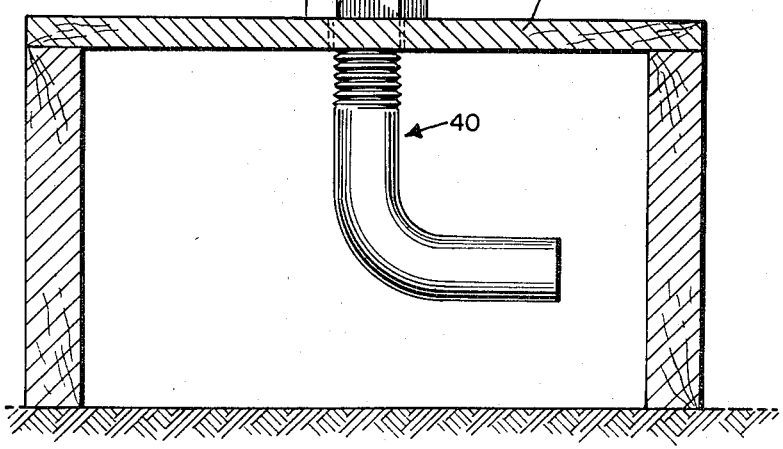
FIG. 5 is a side elevation of a combination of an anchor bolt, a template, and a cap of this invention with clamping means affixed thereto, a portion of the sidewall of the cap being broken away to illustrate the engagement between the thread gripping means on the interior of the cap and the threads on the shank of the anchor bolt.
Figure 6:
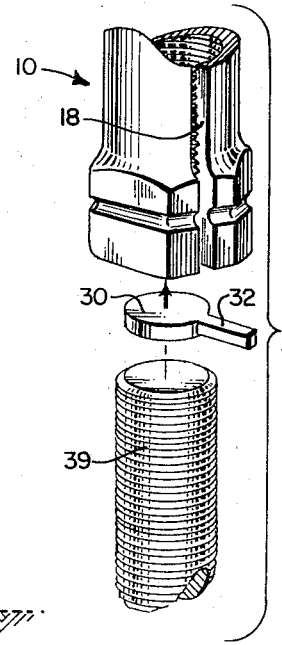
FIG. 6 is an exploded view in perspective of the lower portion of a slotted cap of this invention, the upper portion of a threaded shank and a member supportable on the upper end of the threaded shank, which member includes a portion which protrudes through said slot to indicate the location of the upper end of the shank when encased by the cap.

It is highly desirable to provide thread gripping means on the interior of the cap so that when an external constrictive force is applied, they tightly grip at least a portion of the threaded shank 39 encased by the cap. As indicated in FIGS. 2, 5 and 7 these thread gripping means are preferably threads 20 which may be of a different pitch from the threads of the anchor bolt being encased but which preferably have the same pitch as the threads on the anchor bolt. In either case the threads on interior wall of the body around the bore are oversized relative to the threaded anchor bolts—i.e., there is some slack or play between them. Other types of thread gripping means include horizontally positioned ridges (note FIG. 14), rounded projections (note FIG. 15), and other suitable configurations. Irrespective of the type of thread gripping means employed, the cap should loosely encase the threaded shank prior to application of the constrictive force and tightly engage the threaded shank after application of the constrictive force. Thus as indicated in the Figures the thread gripping means should be circumferentially positioned around the interior of bore 14 so that they will be in a position to tightly engage at least a portion of the threaded shank 39 of the anchor bolt encased within the cap when an external constrictive force is applied to body 10. Naturally, the constrictive force is normally applied sufficiently close to open end 12 to enable or facilitate contraction in body diameter to the extent necessary to bring about this tight engagement.

The exterior of body 10 is preferably fitted with one or more grooves 22 (FIGS. 1, 2, 9, 12, 14, 15) or a depressed annular flat zone 24 (FIG. 7) or the like to receive a tie wire 34, clamp 36, or other device adapted to apply the constrictive force to the exterior of the body. Note FIGS. 5 and 8 in this connection. Groove 22, zone 24 or other equivalent arrangement for receiving clamping means and for restraining the clamping means against axial movement is generally positioned in proximity to open end 12, especially when the body contains but one slot 18. Also it is desirable although not essential to position the thread gripping means or at least a portion thereof radially inwardly relative to the positioning of groove 22, zone 24, or like clamp receiving means so that the constrictive force will be applied to an outside portion of the wall having thread gripping means directly inside at about the same elevation.

It will be seen from the above that the cap normally fits loosely or slides loosely or threads loosely over the threaded end of the shank of the anchor bolt 40. Application of a constrictive force by means of a tie wire 34, clamp 36 or other clamping means tends to cause the lower portion of body 10 to contract in diameter through a reduction in the width of slot 18. In this way the thread gripping means such as threads 20 become tightly engaged with the threads of the threaded anchor bolt 40 so that the anchor bolt can then be held in position on a template 26. It will be seen therefore that the cap of this invention can be quickly installed on the anchor bolt with very little difficulty. Once the anchor bolts are properly clamped and installed on template 26 (FIG. 5) the concrete is poured, evenly distributed and allowed to set. Normally the base of body 10 is of sufficient diameter to rest directly on the upper surface of template 26 around the hole therein (note FIG. 7). However, if necessary, a washer or the like may be inserted between the body and the top surface of the template in order to traverse the hole. If desired, the anchor bolt may be sleeved—see, for example, U.S. Pat. Nos. 3,430,408 and 3,500,607. accumulation The threads on the bolt may be sprayed with oil before fastening the cap in place, thus further protecting the threads against rusting. The cap in turn tends to prevent the accumulation of grit or dirt on the oiled surfaces and thus maintains a relatively clean, lubricated thread for receiving the nut upon installation of the object to be mounted.

Removal of the caps from the anchor bolts seated in the cured concrete is likewise a simple and rapid operation. All that is involved is to detach the tie wire 34, clamp 36 or other clampling device used. This permits the cap to be easily lifted away or otherwise removed from the exposed threaded shank portion of the anchor bolt.

In the embodiments shown in FIGS. 1, 2, 5, 9 and 12, end 16 of the cap is closed and carries threaded stud 28 of the same thread size and diameter as the thread on the shank of the anchor bolt. Accordingly, threaded shank 28 provides a convenient location for keeping the nut 38 which is normally furnished with the anchor bolt but which may be furnished with the cap of this invention. Thus the nut will remain readily available for subsequent use in anchoring the object to the finished foundation. Hence in these embodiments body 10 serves as a temporary connecting link between the nut affixed thereto and the threaded shank encased thereby.

A related embodiment involves providing the combination or an anchor bolt 40, a cap 10 having a matching threaded stud 28, and a nut 38 which fits both the bolt 40 and the stud 28.

In the embodiments depicted in FIGS. 1–4 and 6 the presence of slot 18 in the sidewall of body 10 not only facilitates tight engagement between the thread gripping means and the thread on the shank of the anchor bolt but makes it possible to readily ascertain the extent to which the threaded shank projects upwardly into the cap. For this purpose disc 30 is placed upon and freely supported by the upper end of the threaded end of the shank and the cap is attached so that projection 32 passes horizontally through the slot. The position or elevation of projection 32 thereby provides a convenient, readily perceivable index for fixing the location of the upper end of the encased shank of the anchor bolt.

The embodiment depicted in FIG. 7 carries threaded stud 28 at end 16 of the cap, again for the purpose of carrying nut 38 which fits the threaded shank 39 of the anchor bolt. Additionally, however, the top of cap 10 in this embodiment has a vertical aperture 42 communicating with bore 14. Aperture 42 is sized to accommodate an elongated rod 44 which is freely supported on the upper end of the threaded shank encased by the cap. The extent to which rod 44 protrudes from the top of cap 10 through aperture 42 thereby serves to indicate the location of the upper end of the threaded shank of the anchor bolt. If desired rod 44 may have a suitable scale impressed therein or affixed thereon showing in inches or centimeters, or fractions thereof, the elevation of the upper end of the encased threaded shank relative to the bottom end of body 10.

FIGS. 9, 10 and 11 depict an alternative embodiment of this invention wherein instead of the preferred elongated slots in the sidewall, body 10 has its lower wall provided with a plurality of axially extending slits 46 spiralling upwardly from open end 12 toward the other end 16 of the body. As shown in FIG. 10 these slits radially traverse the sidewall on an angle so that they are almost tangential to the circumference of bore 14. As schematically depicted in FIG. 11 upon application of a constrictive force around the exterior of the slitted body slippage occurs along the surfaces of each of the slits thereby enabling the sidewall to constrict in diameter. In this way the thread gripping means positioned on the interior of the wall are brought into gripping or securing engagement with the threaded shank of the anchor bolt. Thus utilization of a plurality of such radially positioned upwardly extending slits enables the lower portion of the cap to be sufficiently radially deformable under application of a constrictive force to cause the thread gripping means to tightly engage at least a portion of the threaded shank encased by the cap.

The variant depicted in FIGS. 12 and 13 is similar to that depicted in FIGS. 9, 10 and 11 except that in this instance the wall contains two linear upwardly extending slits 48 positioned on opposite sides of the circumference of cap 10. Each of the slits 48 traverses the sidewall essentially tangentially to the circumference of bore 14. As illustrated in FIG. 13 application of a constrictive force—e.g., by application and tightening of a tie wire 34 in groove 22—causes displacement to occur as between the relative surfaces of slits 48 so that at least a portion of the interior of the cap becomes tightly engaged with at least a portion of the threaded shank encased within the body.

It will be evident from the preceding discussion that the caps of this invention are yieldable in the sense that application of a suitable constrictive force will cause sufficient constriction or inward radial deformation to enable the interior portion of the wall to tightly grip the shank of the threaded member encased by the cap. Accordingly, the caps of this invention may be prepared from a variety of materials having these yieldable characteristics, e.g., certain relatively flexible metals or metal alloys, certain relatively hard but flexible rubbers or elastomers, and the like. Particularly preferred materials for use in preparing the caps of this invention are resins or plastics which have the requisite yieldability or deformation characteristics. For this purpose use may be made of such plastics as polyesters, nylons, styrene acrylonitrile copolymers (SAN), acrylonitrile butadiene styrene terpolymers (ABS), plasticized polyvinyl chloride, polyethylene (especially medium and high density polyethylenes), polypropylene, polyphenylene oxides, polyacetals, cellulose acetate-butyrate, and various other resins or plastics. These and similar engineering-type plastics can be readily shaped or molded into the desired form and they will retain this form under normal service conditions. At the same time materials of this type are sufficiently yieldable to permit enough radial deformation under application of pressure so that the device can function as described herein without breaking. If desired the plastics or resins may be, in accordance with known practices, plasticized and/or they may be filled with suitable fillers or reinforced with fibers, whiskers, or other materials commonly used for this purpose. It is desirable, though not essential, to paint or dye the caps, particularly with a fluorescent or bright coloration so that they may be readily seen under dim or subdued lighting conditions. In this way, persons walking in the vicinity of the capped anchor bolts imbedded in a cured slab are less likely to trip over the upwardly extending anchor bolts.

Figure 1:
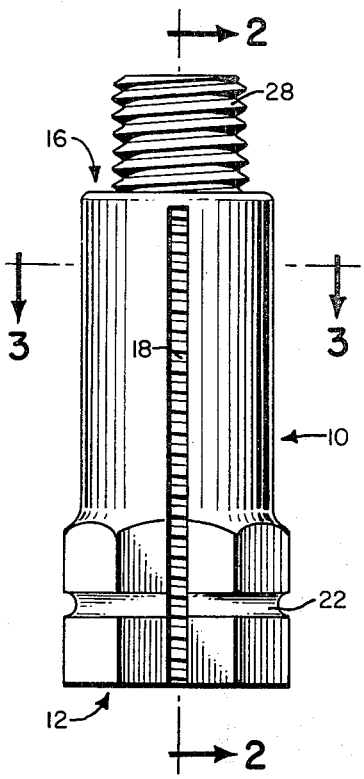
FIG. 1 is a front elevation of a particularly preferred slotted cap of this invention having a threaded stud for carrying a nut.

The caps of this invention may be furnished in various sizes for use with variously sized anchor bolts and other similar threaded members. Caps such as depicted in FIG. 1 are most preferred for use with threaded anchor bolts having diameters of ½ inch, ⅝ inch, ¾ inch, ⅞ inch, 1 inch, 1⅛ inches, 1¼ inches, 1½ inches and 1 ¾ inches. For anchor bolts of larger sizes such as those having diameters of 2 inches, 3 inches, 4 inches and larger, the construction depicted in FIG. 7 is most preferred. For best results the cap should be loosely slidable or loosely threadable over the threaded shank—i.e., there should be a small amount of radial play (e.g., 1/32 inch, 1/16 inch, ⅛ inch, or etc.) and the cap should be designed and constructed so that this play is readily taken up upon application of the constrictive force. This will result in the cap tightly gripping the threaded shank and will prevent the threaded shank from easily slipping away or coming loose from the grasp of the cap until the constrictive force is removed. One of the advantages in fabricating the caps of this invention from many of the plastics referred to above is that upon removal of the constrictive force the body will tend to return or snap back to its original size and shape. This not only facilitates removal of the cap but enables it to be used over and over again as it is not permanently deformed.

From the foregoing it should be clear that the bore in the caps or tubular protective devices of this invention should be long enough to accommodate or encase lengths of threaded shanks customarily encountered when imbedding anchor bolts in concrete foundations. In some cases this will amount to only 3 or 4 inches of bore length but in other instances the bores should be as long as 10 or 12 inches. As a general rule, the length of the bore will usually be greater in caps designed for use with the larger sized anchor bolts (e.g., 2 inches diameter and above) than for the smaller sized anchor bolts. However, this is not a hard and fast rule and the length of the caps and bores may be varied to suit the needs of the occasion. It will of course be evident from this description that the bore may have a uniform diameter along its length, that the bore may be tapered along its length, or that the bore may have one or more radially enlarged sections along its length. Thus the precise configuration of the bore is not critical so long as it can loosely encase or slidably accommodate the threaded shank and so long as at least a portion of the wall around the bore can be brought into tight circumferential gripping relationship or engagement with at least a portion of the encased threaded shank by application of a suitable constrictive force around the outside of the wall.

Wall thickness in the caps of this invention is likewise largely discretionary and to some extent may be influenced by the properties or characteristics of the material from which they are fabricated. In general, however, the walls will be thick enough to give the desired strength, yieldability, and protective capacity to the cap so that they may function as described herein.

While the caps of this invention are especially adapted and eminently suited for use with anchor bolts, they may be used for protecting other objects, such as threaded pipe, threaded studs on machinery, expansion bolts, and the like.

From the foregoing, it will be seen that this invention is one well adapted to attain all of the ends and objectives hereinabove set forth together with other advantages which will now be obvious to those skilled in the art and which are inherent in the invention as depicted, described or claimed, or in its tangible manifestations.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A combination which comprises:
   a. an anchor bolt having a threaded shank;
   b. a template to position the anchor bolt in a selected locus, the template having an aperture therethrough to accommodate said threaded shank;
   c. radially yieldable capping means having a bore therein adapted to receive and encase an end portion of said threaded shank, the interior of said means having thread gripping means around said bore, the top of the capping means having an upwardly extending, threaded stud sized to receive a nut which fits the threaded shank, said capping means having an elongate upwardly extending slot in a sidewall thereof; and
   d. clamping means; the threaded shank of the anchor bolt extending upwardly through the aperture of the template and into the bore of the capping means supported on the template with the base of said capping means resting and supported on or above the upper surface of said template, and the clamping means being positioned around the lower portion of the capping means and applying a constrictive force around the bore of the capping means to cause engagement between said thread gripping means and the threaded shank at a locus above said aperture so that the anchor bolt is held in position.

2. The combination of claim 1 wherein the exterior of the capping means has means restraining the clamping means against upward or downward movement.

3. The combination of claim 1 further including movable means projecting from the capping means indicating the location of the upper end of the encased threaded shank.

4. The combination of claim 1 further including a member freely supported on the upper end of the encased threaded shank, said member including a portion protruding through said slot to indicate the location of the upper end of said shank.

5. The combination of claim 1 wherein the top of the cap has within the periphery of said threaded stud a vertical aperture communicating with the bore and wherein the combination further includes a member freely supported on the upper end of the encased threaded shank, said member including an elongate portion slidable in and protruding from said vertical aperture to indicate the location of the upper end of said shank.

6. A cap adapted to protect and be tightly fitted over the end of a threaded shank of an anchor bolt to support and suspend the bolt through an aperture in a template which cap comprises a hollow tubular body having an open end, said body (a) being adapted to receive and loosely encase a length of the threaded shank, (b) having at its other end an axially extending threaded stud corresponding in thread size and diameter to the end of the threaded shank to be encased thereby, (c) having a slotted wall in which at least one slot extends from the open end toward the other end, (d) having thread gripping means circumferentially positioned on at least a portion of the interior surface of the slotted wall and (e) being sufficiently radially deformable under application of a constrictive force to the exterior of the body to cause said thread gripping means to tightly engage at least a portion of the threaded shank encased by said body, said slotted wall around said open end being of sufficient thickness and diameter to furnish the cap with a base portion adapted and tending to prevent the base of the cap from entering the aperture in the template during application of said constrictive force.

7. A cap in accordance with claim 6 wherein said body is made from yieldable plastic material.

8. A cap in accordance with claim 6 wherein the other end of said body is closed.

9. A cap in accordance with claim 6 wherein the exterior of the body in proximity to the open end has means for receiving clamping means and for restraining said clamping means against axial movement.

10. A cap in accordance with claim 6 characterized by having a single elongate slot in the wall thereof.

11. A cap in accordance with claim 6 characterized by having one end of said tubular body closed and by having a single elongate slot in the wall thereof extending linearly from said open end toward the closed end.

12. A cap in accordance with claim 6 characterized in that said thread gripping means comprise threads around the interior wall of said body.

13. A cap in accordance with claim 6 characterized in that said thread gripping means comprise threads around the interior wall of said body, said threads being of the same pitch as the pitch of the threads of the threaded shank to be encased thereby.

14. A cap in accordance with claim 6 wherein said body is made from yieldable plastic material and has one end closed, said body having a single elongate slot in the wall thereof extending linearly from said open end toward the closed end.

15. A cap in accordance with claim 14 further characterized in that said thread gripping means comprise threads around the interior wall of said body at least in proximity to the open end of said body, and in that the exterior of said body in proximity to said open end has means for receiving clamping means and for restraining said clamping means against axial movement.

16. In combination, a cap in accordance with claim 6 encasing the end of a threaded shank and clamping means applying said constrictive force.

17. The combination of claim 16 further including a member freely supported on the upper end of the encased threaded shank, said member including a portion protruding through a slot in the wall of said tubular body to indicate the location of the upper end of said shank.

18. A cap adapted to protect and be tightly fitted over the end of a threaded shank of an anchor bolt to support and suspend the bolt through an aperture in a template which cap comprises a hollow tubular body having an open end, said body (a) being adapted to receive and loosely encase a length of the threaded shank, (b) having at its other end an axially extending threaded stud corresponding in thread size and diameter to the end of the threaded shank to be encased thereby, (c) having thread gripping means circumferentially positioned on at least a portion of its interior surface, (d) being sufficiently radially deformable under application of a constrictive force to the exterior of the body to cause said thread gripping means to tightly engage at least a portion of the threaded shank encased by said body, and (e) having a wall around said open end of sufficient thickness and diameter to provide a base portion adapted to prevent the base of the cap from entering a proximately-sized aperture in the template accommodating the shank of the bolt.

19. A cap in accordance with claim 18 wherein said body is made from yieldable plastic material, wherein the end of said body having said threaded stud is closed, wherein the exterior of the body in proximity to the open end has means for receiving clamping means and for restraining said clamping means against axial movement, and wherein said thread gripping means comprise threads around the interior wall of said body.

20. In combination, (1) a cap in accordance with claim 18 further characterized in that the top of the threaded stud of said cap has an axially extending aperture communicating with the hollow interior of said body, and (2) a member freely movable within the hollow interior of said body and adapted to rest upon the upper end of an encased threaded shank, said member including an elongate portion adapted to slide in and to protrude from said axially extending aperture to indicate the location of the upper end of an encased threaded shank.

21. A cap adapted to protect and be tightly fitted over the end of a threaded shank of an anchor bolt to support and suspend the bolt through an aperture in a template which cap comprises a hollow tubular body having an open end, said body (a) being adapted to receive and loosely encase a length of the threaded shank, (b) having a slotted wall in which at least one slot extends from the open end toward the other end, (c) having at said other end an axially extending threaded stud sized to receive a nut which fits the threaded shank, (d) having thread gripping means circumferentially positioned on at least a portion of the interior surface of the slotted wall and (e) being sufficiently radially deformable under application of a constrictive force to the exterior of the body in proximity to said open end to cause said thread gripping means to tightly engage at least a portion of the threaded shank encased by said body, said slotted wall having around said open end a radially extending wall portion of increased thickness thereby furnishing the cap a base portion of increased girth to rest on or over the surface of the template about the bolt-receiving aperture therethrough.

22. A cap in accordance with claim 21 wherein said body is made from yieldable plastic material and wherein the wall of said body has only one slot.

23. A cap in accordance with claim 21 wherein said body is made from yieldable plastic material and has one end closed, said body having a single elongate slot in the wall thereof extending linearly from said open end toward the closed end.

24. A cap in accordance with claim 21 wherein said body is made from yieldable plastic material, wherein the exterior of the body in proximity to the open end has means for receiving clamping means and for restraining thread clamping means against axial movement and wherein said thread gripping means comprise threads around the interior wall of said body.

25. A cap in accordance with claim 21 wherein said body is made from yieldable plastic material, wherein the other end of said body is closed, wherein the wall of said body has only one slot, wherein said thread gripping means comprise threads around the interior wall of said body at least in proximity to the open end of said body, and wherein the exterior of said body in proximity to said open end has means for receiving clamping means and for restraining said clamping means against axial movement.

26. A cap in accordance with claim 21 characterized in that the top of said threaded stud has an axially extending aperture communicating with the hollow interior of said body, said aperture being adapted to receive an elongate member axially slidable therein.

27. In combination, a cap in accordance with claim 21 encasing the end of a threaded shank and clamping means applying said constrictive force.

28. In combination, (1) a cap in accordance with claim 21 further characterized in that the top of the threaded stud of said cap has an axially extending aperture communicating with the hollow interior of said body, and (2) a member freely movable within the hollow interior of said body and adapted to rest upon the upper end of an encased threaded shank, said member including an elongate portion adapted to slide in and to protrude from said axially extending aperture to indicate the location of the upper end of an encased threaded shank.

* * * * *